United States Patent
Snodgrass, Jr.

(10) Patent No.: US 7,594,462 B2
(45) Date of Patent: Sep. 29, 2009

(54) BLADE TENSION GAUGE

(76) Inventor: Howard L. Snodgrass, Jr., 1160 Fieldstone Rd., Watkinsville, GA (US) 30677

( * ) Notice: Subject to any disclaimer, the term of this patent is extended or adjusted under 35 U.S.C. 154(b) by 336 days.

(21) Appl. No.: 10/924,123

(22) Filed: Aug. 23, 2004

(65) Prior Publication Data

US 2006/0037448 A1   Feb. 23, 2006

(51) Int. Cl.
   B23D 55/10   (2006.01)
   B27B 13/08   (2006.01)
(52) U.S. Cl. .............................. 83/802; 83/62.1; 83/816
(58) Field of Classification Search ..................... 83/58, 83/62, 62.1, 522.11, 522.14, 788, 802, 814, 83/816, 817, 818, 819; 73/862.391, 862.451, 73/862.453, 862.473, 862.474, 862.625, 73/862.627, 862.392
See application file for complete search history.

(56) References Cited

U.S. PATENT DOCUMENTS

| | | | | |
|---|---|---|---|---|
| 2,395,237 | A | * | 2/1946 | Swenson .......................... 83/98 |
| 2,607,373 | A | * | 8/1952 | Crane ........................... 83/62.1 |
| 2,644,492 | A | * | 7/1953 | Crane ........................... 83/819 |
| 2,963,054 | A | * | 12/1960 | Eschenburg .................. 83/802 |
| 2,969,815 | A | * | 1/1961 | Lasar ........................... 83/818 |
| 3,680,417 | A | | 8/1972 | Wells |
| 3,733,952 | A | * | 5/1973 | Fukugami et al. ............. 83/789 |
| 3,810,409 | A | | 5/1974 | Allen et al. |
| 3,838,620 | A | | 10/1974 | Baldrey et al. |
| 3,842,667 | A | * | 10/1974 | Alexander et al. ..... 73/862.641 |
| 3,905,266 | A | | 9/1975 | Weavell et al. |
| 3,946,634 | A | | 3/1976 | Allen et al. |
| 4,085,636 | A | | 4/1978 | Eklund |
| 4,094,218 | A | | 6/1978 | Flanigan et al. |
| 4,329,901 | A | | 5/1982 | Stroud |
| 4,342,241 | A | | 8/1982 | Eklund |
| 4,386,545 | A | * | 6/1983 | Chaconas ..................... 83/817 |
| 4,557,168 | A | | 12/1985 | Tokiwa |
| 4,901,612 | A | | 2/1990 | Harris |
| 4,926,733 | A | * | 5/1990 | Janson ......................... 83/819 |
| 5,035,166 | A | | 7/1991 | Carlson et al. |
| 5,070,751 | A | | 12/1991 | Harris |
| 5,176,055 | A | | 1/1993 | Wijesinghe et al. |
| 5,237,897 | A | | 8/1993 | Wijesinghe et al. |
| 5,819,630 | A | | 10/1998 | Smith |
| 5,904,083 | A | | 5/1999 | Jensen et al. |
| 6,041,682 | A | | 3/2000 | Jensen et al. |

(Continued)

FOREIGN PATENT DOCUMENTS

WO   WO 90/12669   11/1990

*Primary Examiner*—Clark F. Dexter
(74) *Attorney, Agent, or Firm*—The Webb Law Firm

(57) ABSTRACT

Disclosed is a blade tension gauge for a band saw which provides a constant reading of the magnitude of the forces that act to put tension on the blade. The band saw includes a moveable wheel, a blade, and a frame, where movement of the moveable wheel in relation to the frame tensions the blade. The blade tension gauge includes a wheel positioning assembly rigidly connected to the moveable wheel and connected to the frame to be moveable relative to the frame. A load element is positioned to receive a load existing between the wheel positioning assembly and the frame. A sensor is configured to measure the load. A display is configured to display the tension value. Also disclosed is a method for outputting the tension of the blade of a band saw.

14 Claims, 2 Drawing Sheets

U.S. PATENT DOCUMENTS 6,557,447 B2 * 5/2003 Lee .............................. 83/816
6,817,393 B2 * 11/2004 Quenneville ................ 144/357
2002/0059856 A1 5/2002 Smith
2003/0015256 A1 * 1/2003 Quenneville ................ 144/357

* cited by examiner

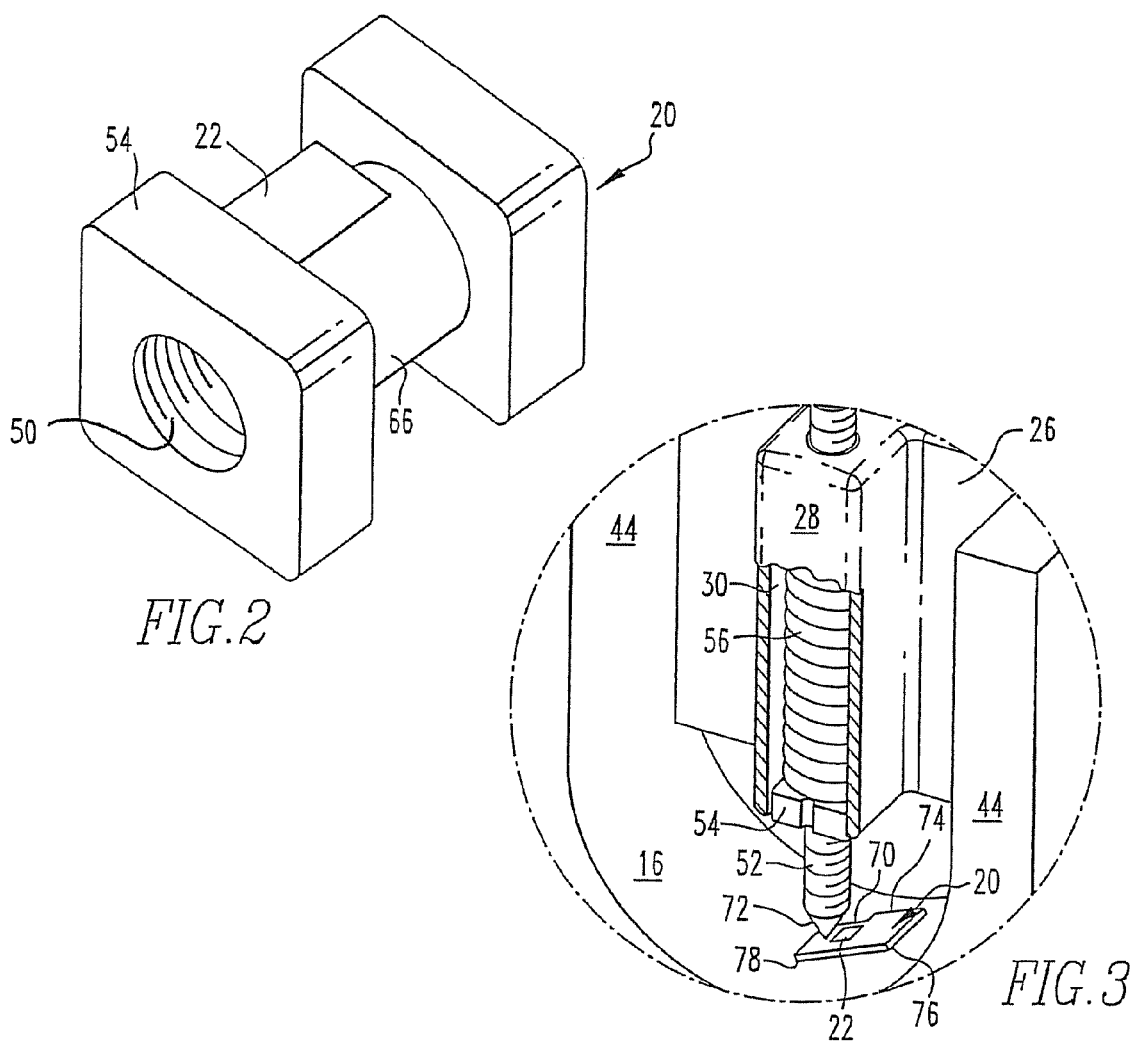
FIG.2
FIG.3
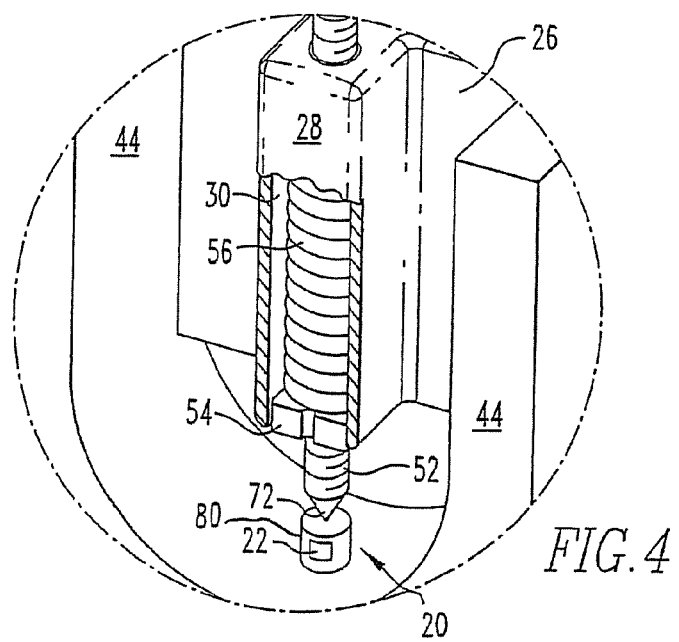
FIG.4

BLADE TENSION GAUGE

BACKGROUND OF THE INVENTION

1. Field of the Invention

The present invention is directed to blade tension gauges for band saws and the like.

2. Description of Related Art

In order to cut properly, the blade of a band saw must be pre-tensioned to an adequate degree so that the blade can more easily resist any twisting or sideways movement during cutting. Blades of different sizes require different loads to achieve this state. Loads that are too low do not provide adequate stiffness to the blade. Loads that are too high can cause blade breakage and premature failure. Current practice for many users is to adjust the blade tension "by ear", that is to apply load until the tension "feels right" in terms of the sound the blade makes and the way it performs. Another practice is to physically push on the blade to deform the blade. The degree of deflection of the blade is used as an indication of the blade tension. Yet another practice is to install a spring in the blade tensioning mechanism. The degree of deflection of the spring as the blade is tensioned provides an indication of the load on the blade. Users simply apply load until the end of the spring lines up with the proper point on a scale marked on the saw. These methods are notoriously inaccurate and make it difficult to consistently set just the right tension for best performance and longest blade life.

Another practice currently in use by users who desire a more accurate reading of blade tension or strain is the use of a special mechanical gauge applied directly to the steel of the blade. Such gauges work by measuring the deflection of a specified length of a section of the blade. Such gauges do give fairly accurate results, but can only be used when the blade is stationary and cannot provide information about the tension in a blade as a band saw is actually running and cutting material. Since they are relatively expensive and somewhat cumbersome to use, many band saw users do not own such a device. Even those who have such a gauge seldom use it as often or diligently as they should to ensure proper operation of their saw.

SUMMARY OF THE INVENTION

It is an object of this invention to provide the end user with a constant reading of the magnitude of the forces that act to put tension on the blade of a band saw as it operates.

The present invention is a blade tension gauge for a band saw. The blade tension gauge utilizes a member that becomes an integral part of the blade tensioning load path and that is configured in such a way that some portion of that member is under predictable tension or compression when the band saw blade is under load. Appropriate sensing elements are attached to that member so that the degree of compression or tension can be constantly monitored, even when the band saw blade is operating in cutting mode. An electronic or mechanical device takes the data produced by the sensing element and presents a readout value to the user which indicates the degree to which the blade is loaded in tension. This device becomes an integral part of the saw, so blade tension information is always available whether the saw is stationary or running.

A conventional band saw for use with the present invention includes a moveable wheel, a blade, and a frame, where movement of the moveable wheel in relation to the frame tensions the blade. The blade tension gauge of the present invention includes a wheel positioning assembly rigidly connected to the moveable wheel and connected to the frame to be moveable relative to the frame. A load element is positioned to receive a load existing between the wheel positioning assembly and the frame. A sensor is configured to read the load. A circuit is in communication with the sensor and configured to analyze load to determine a tension value. A display is in communication with the circuit and configured to display the tension value.

Preferably, the present invention includes a metal element under either compression or tension. The element is fitted with electric strain gauge elements whose output signal is analyzed by an electronic circuit with the resulting load value presented on an electronic display. This load measuring element is placed between some fixed portion of the band saw frame structure and the moveable support structure attached to the band saw's moveable wheel.

It is contemplated that the present invention may include:

a) A device using a member of any shape which is deflected either in tension, compression, or bending which deflects predictably as a result of blade load and whose deflections are measured in a manner similar to that described above.

b) A device which uses the change in current or voltage produced in a sensing circuit by the movement of an element as a result of the load being applied to a blade.

c) A device which would use electrical motive force to move an element, either directly or through the action of a lever or screw element, to apply tension load to the blade. The current or voltage used to move the element could be taken as a measure of the load being applied.

d) A sealed, fluid filled element designed to compress under load in such a way the pressure of the enclosed fluid would increase predictably as load was increased. The level of pressure could be measured and presented to the user as an indication of tension load on the blade. Conversely, the fluid could be pressurized to a known level causing the element to expand in such a way that it would put a known load on the blade.

e) A device similar to d) above which would use pneumatic rather than hydraulic pressure.

f) A device which uses measurements of changes in light waves, either directly or through fiber optics, as an indication of the deflection of the blade or of a secondary element as a way of determining the load on the blade.

BRIEF DESCRIPTION OF THE SEVERAL VIEWS OF THE DRAWINGS

FIG. 2 is a perspective schematic front view of an embodiment of a load element according to the present invention;

FIG. 3 is a partial perspective schematic front view of another embodiment of a blade tension gauge according to the present invention installed on a band saw; and FIG. 4 is a partial perspective schematic front view of yet another embodiment of a blade tension gauge according to the present invention installed on a band saw.

DETAILED DESCRIPTION OF THE PREFERRED EMBODIMENTS

Figure 1:
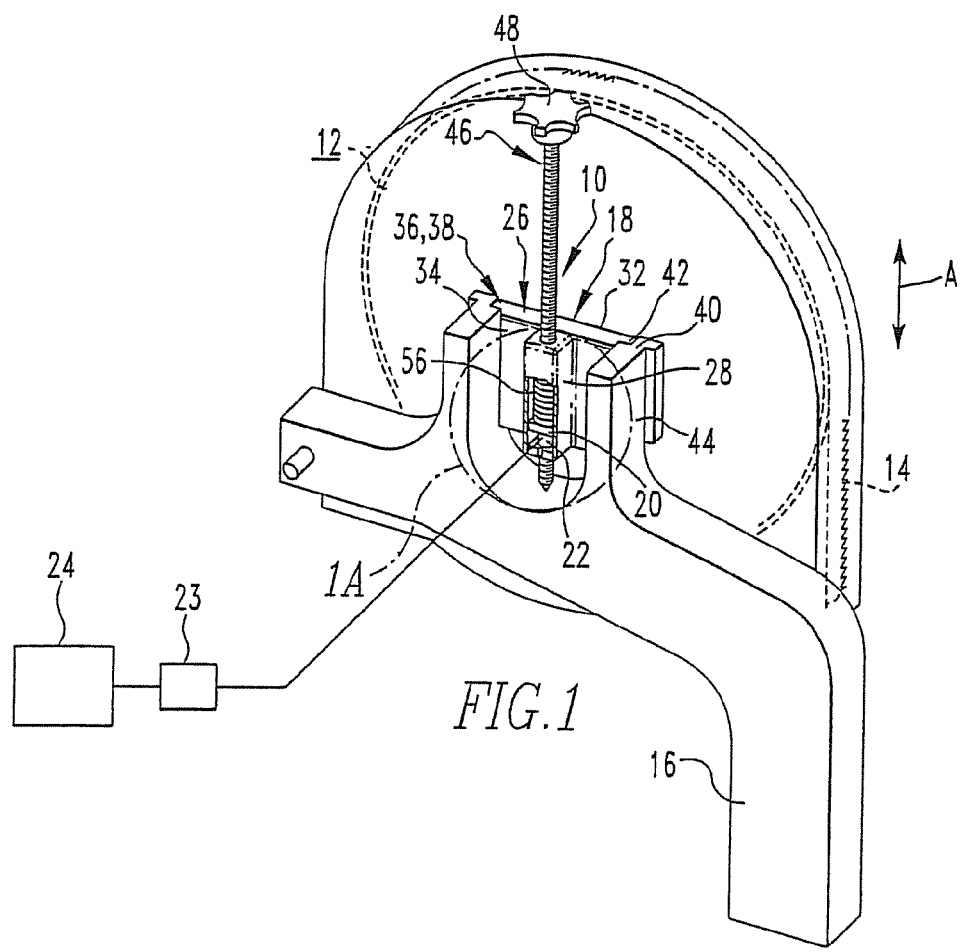
FIG. 1 is a perspective schematic front view of an embodiment of a blade tension gauge according to the present invention installed on a band saw.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1A:
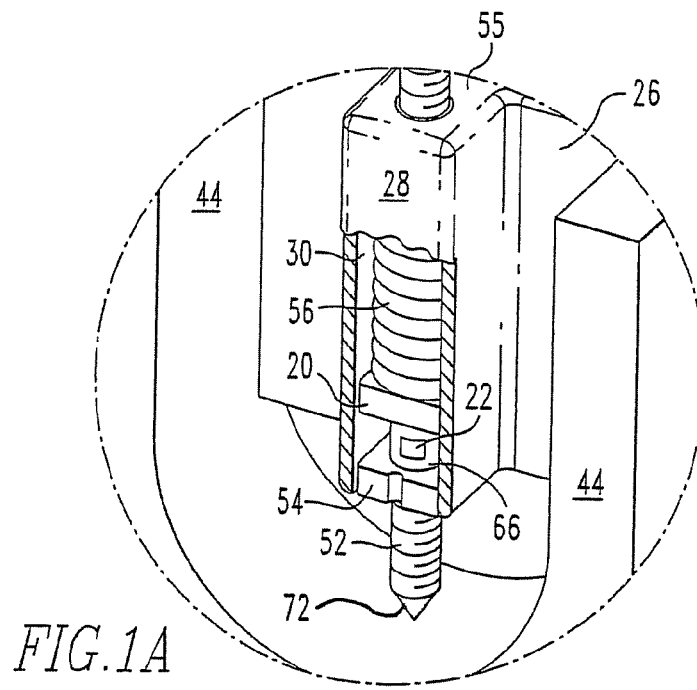
FIG. 1A is a partial perspective schematic front view of the blade tension gauge shown in FIG. 1.

Referring to FIGS. 1, 1A, and 2, the present invention is a blade tension gauge 10 for a band saw. The band saw may be a conventional band saw having, inter alia, a moveable wheel 12, a blade 14, and a frame 16. Movement of the moveable wheel 12 in relation to the frame 16 tensions the blade 14. The blade tension gauge 10 includes a wheel positioning assembly 18, a load element 20, a sensor 22, a circuit 23, and a display 24. The load element 20, the sensor 22, the circuit 23, and the display 24 are shown schematically in the drawings.

The wheel positioning assembly 18 is connected to both the moveable wheel 12 and the frame 16 such that the wheel positioning assembly 18 and the moveable wheel 12 move in concert relative to the frame 16. Movement of the wheel positioning assembly 18 and, thus, of the moveable wheel 12 adjusts the tension in the blade 14. Such movement is achieved by the wheel positioning assembly 18 being rigidly connected to the moveable wheel 12 and connected to the frame 16 to be moveable relative to the frame 16.

The wheel positioning assembly 18 includes a positioning member 26 connected to both the moveable wheel 12 and the frame 16. The positioning member 26 includes a guide 28 having a passageway 30 therethrough.

Preferably, the positioning member 26 includes a first side 32 connected to the moveable wheel 12 and a second side 34 connected to the frame 16. The guide 28 and the passageway 30 extend along the second side 34 substantially parallel to the moveable wheel 12 and in a desired direction of travel A of the moveable wheel 12.

The positioning member 26 and the frame 16 include travel members 36 that cooperate with each other to assist with the movement of the wheel positioning assembly 18 relative to the frame 16. The travel members 36 help maintain alignment of the wheel positioning assembly 18, the frame 16, and the moveable wheel 12 during travel of the moveable wheel 12 in the desired direction. For example, the travel members 36 may be a linear bearing assembly 38 including a cooperating rail 40 and bearing 42. Each of the rail 40 and the bearing 42 extends substantially parallel to the guide 28 and passageway 30. The rail 40 is located on either the positioning member 26 or the frame 16 and the bearing 42 on the other of the positioning member 26 or the frame 16, and vice versa.

In a preferred embodiment, the frame 16 includes a pair of arms 44. The arms 44 may extend in the desired direction of travel A of the moveable wheel 12. A rail 40 or bearing 42 is located on each of the arms 44, with corresponding travel members 36 located on the positioning member 26. The guide 28 is positioned on the positioning member 26 to be between the arms 44 of the frame 16.

The wheel positioning assembly 18 further includes a rod 46. The rod 46 is configured to be received within the passageway 30 of the guide 28 of the positioning member 26. Rotation of the rod 46 moves the wheel positioning assembly 18 relative to the frame 16. Thus, the rod 46 preferably extends longitudinally. The rod 46 may include a handle 48 to assist in rotating the rod 46.

The wheel positioning assembly 18 may also include a spring 56 positioned around the rod 46. The spring 56 acts as a shock absorber for the assembly. Any deviations or defects in the blade 14 which may cause a jar to the assembly during use of the band saw can be absorbed by the spring 56. The spring 56 also provides a way to visually monitor the tension of the blade 14, that is, the deflection of the spring relates to the amount of tension on the blade 14.

In a preferred embodiment of the present invention, the rod 46 includes an end 72 and a threaded portion 52. A nut 54 having threads 50 is provided and is configured to engage the threaded portion 52 of the rod 46. The nut 54 is constrained from rotating with the rod 46. As the rod 46 is rotated, the end 72 of the rod engages the frame 16 and the nut 54 travels along the rod 46 in a direction away from the end 72. The positioning and configuration of the nut 54, the rod 46, and the wheel positioning assembly 18 is such that since the nut 54 does not rotate with the rod 46, eventually the nut 54 will press, directly or indirectly, against the wheel positioning assembly 18 to move the wheel positioning assembly 18 in relation to the frame 16.

Referring to FIG. 1A, the nut 54 is located within the guide 28. When the rod 46 is rotated in a blade-tightening direction, the nut 54 advances toward an upper end 55 of the guide 28. Further rotation of the rod 46 causes the nut 54 to press against the load element 20, which in turn compresses spring 56. This forces guide 28 and, thus, the wheel positioning assembly 18 to move relative to the frame 16.

The guide 28 and the nut 54 may be square in cross-section, with the nut 54 engaging the rod 46 within the guide 28. With the square nut 54 within the square guide 28, rotation of the nut 54 is prevented, thereby forcing the nut 54 to travel along the rod 46. The guide 28 and the nut 54 may be in any corresponding configurations that would prevent the nut 54 from rotating with the rod 46, for example, hexagonal, octagonal, etc.

When the blade 14 is in position over the moveable wheel 12, the interactions of the blade 14, the moveable wheel 12, the wheel positioning assembly 18, and the frame 16 create a load path. The load element 20 is positioned in the load path in order to receive the load existing between the wheel positioning assembly 18 and the frame 16. The load corresponds to the amount of tension on the blade 14.

The load element 20 includes a sensor 22. The load element 20 may be made of a standard ductile steel or aluminum. The load element 20 must be ductile enough to impart measurable deformation under load, but strong enough to resist failure at normal band saw blade tensions. The sensor 22 may be a deformable metal foil which has lead wires (not shown) epoxy-bonded thereto. When the load element is put under load, the foil deforms as the load element 20 deforms. The electrical resistance of the foil changes as its length changes. Thus, in a manner well known in the strain gauge art, the circuit 23 can detect the change in resistance of foil 22, and thereby calculate the tension on blade 14. This calculation is then output to display 24.

Alternatively, the load element 20 may include for sensor 22 (in place of foil) a hydraulic apparatus (not shown) having a hydraulic pressure variable under the load. In this case, the sensor 22 and circuit 23 measure variations in the hydraulic pressure under the load.

The load element 20 may be positioned within the wheel positioning assembly 18, for example, positioned on the rod 46 within the guide 28, as shown in FIGS. 1 and 1A. Alternatively, the load element 20 may be positioned between the wheel positioning assembly 18 and the frame 16, for example, positioned between the end 72 of rod 46 and frame 16 (as shown in FIG. 4) or positioned on the frame 16 adjacent the rod 46 (as shown in FIG. 3).

The load element 20 may include a body 66 positioned on the rod 46 and at least partially surrounding the rod 46. It is the body 66 of the load element 20 that receives the load corresponding to the tension of the blade 14. The sensor 22 is located on the body 66 of the load element 20 to measure the load.

Referring to FIG. 1A, with respect again to the first presently preferred embodiment of the blade tension gauge 10, the load element 20 is positioned on the rod 46 within the guide 28. The nut 54 is located on the rod 46, adjacent the load element 20, near the end 72 opposite of the handle 48 of the rod 46, and within the guide 28. The spring 56 is located adjacent the load element 20, opposite the nut 54, and within the guide 28. In a variation of this embodiment, the nut 54 and the body 66 of the load element 20 are unitary. This one piece unit decreases the number of parts in the blade tension gauge 10.

Referring to FIG. 3, in another embodiment of the blade tension gauge 10, the load element 20 is positioned on the frame 16 adjacent the wheel positioning assembly 18. The load element 20 includes a body 70 connected to the frame 16 and engageable with an end 72 of the rod 46. The body 70 receives the load via the end 72 of the rod 46. For example, the body 70 has a tab 74 fixedly attached at one end 76 to the frame 16. Another end 78 of the body 70 extends freely above the frame and is adjacent the end 72 of the rod 46. Downward force on the rod 46 causes the other end 78 of the body 70 to deflect. This deflection is measured by sensor 22 (for example using a foil as described above) to provide an indication of the blade 14 tension.

Referring to FIG. 4, in this embodiment rod 46 bears on the top surface of load element 20, and the deflection of load element 20 thereby imparted is measured by sensor 22 (along with circuit 23) to provide output to display 24. Sensor 22 may be of the foil type as described above. In that case, load element 20 could be a ductile steel (or aluminum) plug 80 either welded to or integral with frame 16.

Other variations on the embodiment shown in FIG. 4 are as follows. First, the load element 20 may be a sealed, fluid-filled element designed to compress under load in such a way that the pressure of the enclosed fluid would increase predictably as load was increased. The level of pressure would then be measured by sensor 22 and presented (through circuit 23) as an indication of tension load on the blade via display 24. Conversely, the fluid could be pressurized to a known level, causing the element 20 to expand, thereby raising rod 46 and putting a known load on the blade. The system in this variation could use pneumatic rather than hydraulic pressure.

Next, the load element 20 in FIG. 4 could be an electromechanical device which moves the rod 46 upward to apply tension load to the blade. The current or voltage used to move the rod 46 could be taken as a measure of the load being applied to the blade 14.

Finally, it is contemplated that an optical fiber could take the place of the foil (described above) to constitute the sensor 22. Thus, when the load element 20 is deflected, such as when on body 70 shown in FIG. 3, the length of the optical fiber would change. The phase of a light signal passed through that fiber would also change, correspondingly. When measuring this phase change of the light signal, one can determine the tension on the blade 14 via an appropriately configured circuit 23. In this example, the optical fiber would be secured to the body 70 of the load element 20 and equipment necessary for passing light to the optical fiber (and measuring its phase change) would be present as will be appreciated to those skilled in the art. When the body 70 is deflected, the optical fiber would experience a change in length, thus imparting a phase change in light being passed and reflected inside the optical fiber.

With respect to all embodiments, the sensor 22 is configured to measure the load on the load element 20. The circuit 23 analyzes the load to determine a tension value and communicates the tension value to the display 24. The display 24 is configured to display the tension value. The sensor 22, the circuit 23, and the display 24 may include electrical and/or mechanical elements depending on the type of load element 20 utilized. For example, if a metal member is utilized with a strain gauge, the circuit 23 and display 24 would be electronic. If a hydraulic apparatus is utilized, the circuit 23 and display 24 could be mechanical. These elements may be commercially available or custom made, as long as the sensor 22 is capable of measuring or detecting the load on the load element 20 and the display 24 is capable of displaying the load/tension value.

During operation and non-operation of the band saw, the display 24 provides, preferably continuously, a reading of the load sensed on the load element 20. This allows the tension of the blade 14 to be continuously monitored. Additionally, during non-operation, adjustments of the tension of the blade 14 through the wheel positioning assembly 18 can be monitored through the display 24 instead of relying on a sight or sound test of the blade 14 or a sight test of the spring 56.

Preferably, the circuit 23 is configured to provide an automatic shut-off of the band saw should the load drop below a predetermined value. Thus, the band saw cannot be turned on when the blade is out of tension. This is a desired safety feature to prevent injuries to a user or the equipment, for example, in the case where the blade 14 breaks.

The present invention has been described in relation to a conventional band saw where the moveable wheel slides in relation to the frame in order to adjust the tension in the blade. It is contemplated that the present invention could be applied to any configuration of a saw where the moveable wheel is forced apart from another wheel to create a separation and tension on the blade, for example, a saw where the moveable wheel separates from the frame in a scissor-hinged type of movement and the like.

It will be understood by those skilled in the art that while the foregoing description sets forth in detail preferred embodiments of the present invention, modifications, additions, and changes might be made thereto without departing from the spirit and scope of the invention.

The invention claimed is:

1. A blade tension gauge on a band saw having a moveable wheel, a blade, and a frame, where movement of the moveable wheel in relation to the frame tensions the blade, comprising:

a wheel positioning assembly rigidly connected to the moveable wheel and connected to the frame to be moveable relative to the frame, the wheel positioning assembly including:

a positioning member including a guide having a passageway, the positioning member rigidly connected to the moveable wheel and connected to the frame to be moveable relative to the frame;

a rod extending through the passageway of the guide, the rod includes a threaded portion;

a spring positioned around the rod; and a threaded nut that engages the threaded portion of the rod, and rotation of the rod forces the nut to travel along the rod thereby forcing the wheel positioning assembly to move relative to the frame;

a load element positioned to receive a load existing between the wheel positioning assembly and the frame, the load element including a sensor configured to measure the load;

a circuit in communication with the sensor and configured to analyze the measure of the load to determine a tension value; and a display in communication with the circuit and configured to display the tension value.

2. The blade tension gauge according to claim 1, wherein the load element is positioned within the wheel positioning assembly.

3. The blade tension gauge according to claim 1, wherein the load element is positioned between the wheel positioning assembly and the frame.

4. The blade tension gauge according to claim 1, wherein the sensor comprises a strain gauge element attached to the load element.

5. The blade tension gauge according to claim 1, wherein:
the guide is square in cross-section, and
the threaded nut is square in cross-section and engages the rod within the guide.

6. The blade tension gauge according to claim 1, wherein the load element and the threaded nut are unitary.

7. The blade tension gauge according to claim 1, wherein:
the load element includes a body,
the body is positioned on the rod and at least partially surrounds the rod, and
the body receives the load.

8. The blade tension gauge according to claim 7, wherein the body is positioned on the rod within the guide.

9. The blade tension gauge according to claim 7, wherein the body is positioned on the rod between the guide and the frame.

10. The blade tension gauge according to claim 1, wherein:
the rod includes an end,
the load element includes a body connected to the frame and engageable with the end of the rod, and
the body receives the load via the end of the rod.

11. The blade tension gauge according to claim 1, wherein:
the positioning member includes a first side and a second side,
the first side is rigidly connected to the moveable wheel,
the second side is connected to the frame and including a first travel member, and
the frame including at least one arm, the arm including a second travel member configured to cooperate with the first travel member during movement of the wheel positioning assembly relative to the frame.

12. The blade tension gauge according to claim 11, wherein the first travel member is one of a rail or a bearing, and the second travel member is the other of the rail or the bearing.

13. The blade tension gauge according to claim 1, wherein the rod includes a handle.

14. The blade tension gauge according to claim 1, wherein:
the load element includes a metal member deformable under the load, and
the sensor measures deformation of the metal member under the load.

\* \* \* \* \*

UNITED STATES PATENT AND TRADEMARK OFFICE
CERTIFICATE OF CORRECTION

PATENT NO.         : 7,594,462 B2
APPLICATION NO.    : 10/924123
DATED              : September 29, 2009
INVENTOR(S)        : Howard L. Snodgrass, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Twenty-eighth Day of September, 2010

David J. Kappos
*Director of the United States Patent and Trademark Office*